US006517622B1

(12) United States Patent
Fiebag et al.

(10) Patent No.: US 6,517,622 B1
(45) Date of Patent: Feb. 11, 2003

(54) ADDITIVE CORRECTION FLUID FOR METAL PRINTING FORMS

(75) Inventors: Ulrich Fiebag, Nienstadt (DE); Uwe Tondock, Nienstadt (DE)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 142 days.

(21) Appl. No.: 09/655,241

(22) Filed: Sep. 5, 2000

(51) Int. Cl.[7] .............................................. C09D 10/00
(52) U.S. Cl. ............................... 106/31.93; 106/31.32; 106/31.64
(58) Field of Search .......................... 106/31.93, 31.64, 106/31.32

(56) References Cited

U.S. PATENT DOCUMENTS 4,150,623 A 4/1979 Hamilton .................... 101/466
4,834,844 A 5/1989 Pliefke et al. ................ 204/16

FOREIGN PATENT DOCUMENTS

| | | |
|---|---|---|
| EP | 0 046 656 A | 3/1982 |
| EP | 0 389 283 A | 9/1990 |
| WO | WO 93 23485 | 11/1993 |

OTHER PUBLICATIONS

Database WPI, Week 197433, Derwent Publications Ltd., London, GB, Jul. 1974.

*Primary Examiner*—Helene Klemanski
*Assistant Examiner*—Veronica F. Faison
(74) *Attorney, Agent, or Firm*—RatnerPrestia

(57) ABSTRACT

A composition for positive correction of lithographic printing plates, applicable by pen or by brush, is disclosed. The correction fluid contains a film forming phosphate ester and a solvent that does not dissolve image areas of the printing plate. A correction kit containing the composition and methods for correcting printing plates by additive correction are also disclosed.

29 Claims, No Drawings

ADDITIVE CORRECTION FLUID FOR METAL PRINTING FORMS

FIELD OF THE INVENTION

This invention relates to a composition for positive correction of lithographic printing plates. In particular, the invention relates to a correction fluid applicable by a pen or a brush. The invention also relates to a correction kit containing the composition and methods for adding image areas to a printing plate.

BACKGROUND OF THE INVENTION

The art of lithographic printing is based upon the immiscibility of oil and water. The oily material or ink is preferentially retained by the image area and the water or fountain solution is preferentially retained by the non-image area. When a suitably prepared surface is moistened with water and an ink is applied, the background or non-image area retains the water and repels the ink, while the image area accepts the ink and repels the water. The ink on the image area is then transferred to the surface of a material upon which the image is to be reproduced, such as paper, cloth, and the like. Typically, the ink is transferred to an intermediate material called the blanket, which in turn transfers the ink to the surface of the material upon which the image is to be reproduced.

Lithographic printing plates typically comprise a radiation-sensitive coating applied over the hydrophilic surface of a support. If after exposure to radiation the exposed regions of the coating become soluble or dispersible in a developer and are removed in the developing process, revealing the underlying hydrophilic surface of the support, the plate is called a positive-working printing plate. Conversely, if the exposed regions of the plate become insoluble in the developer, and the unexposed regions are removed by the developing process, the plate is called a negative-working plate. Independent of the specific type of printing plate (positive working or negative working plate imaged by the use of a mask, plates which are directly imageable by a laser, i.e. without using a mask, organic photoconductive plates, etc.), the image area (i.e. the image-wise remaining parts of the coating after the developing of the plate) is ink-receptive or oleophilic and the non-image area or background is water-receptive or hydrophilic.

If the developed plate shows "errors" in the form of missing image areas, it is time consuming and expensive to prepare a new plate. Therefore, additive correction fluids have been developed that add further image areas and make the printing plate suitable for use. These fluids can be applied to non-image areas of a plate to make corrections or to add signs and marks thereon.

Various methods for the correction of lithographic printing plates have been disclosed. DE-A-3717653 [Pliefke, U.S. Pat. No. 4,834,844] describes a method for the electrolytic deposition of organic compounds on the aluminum oxide layer. In the examples epoxides, acrylics, melanin resins and polymers based on maleic acid are mentioned as suitable organic compounds. DE-B-2418789 [Hamilton, U.S. Pat. No. 4,150,623] describes a method for the deposition of carbon particles on the aluminum oxide layer at high temperatures. However, these methods are cumbersome to use.

In another method, pens are used for additive correction. These pens work by mechanical rubbing on the plate surface. By this, aluminum oxide is removed and the underlying aluminum then functions as ink receptive area.

In yet another method, pens containing a polyvinylphenolic derivative are used. However, these pens suffer from the disadvantage that image areas obtained by them have only a low press life. Furthermore, the solvent used in the pens may attack the coating of the plate making correction within an image area extremely difficult.

Previously known correction fluids suffer from the disadvantage that they do not show good adhesion to all known substrates, i.e. substrates having different interlayers. A particular correction fluid can only be successfully used with a particular type of plate so the printer must have a different type of correction fluid for each type of printing plate.

Usually, the developed printing plates are subjected to a preheat or a baking step at a temperature of about 50 to about 300° C., preferably about 100° C. to about 250° C. in order to improve the print run stability. Correction fluids based on polymers different from novolac resins (which are often used in the coating of plates) often do not withstand such temperatures.

For large size corrections, the correction fluid is preferably applied by a brush instead of a pen; however, most of the known fluids cannot be applied by a brush but only by a pen.

Thus a need exists for a correction fluid for lithographic printing plates that is applicable to all kinds of plates independent of the type of interlayer present, shows good adhesion on all types of interlayers, can be baked, and produces image areas having a high print run stability. Furthermore, the correction fluid should dry quickly, have no dissolving effect on the image areas of the plate and should preferably be applicable by pen and brush.

SUMMARY OF THE INVENTION

In one embodiment, the invention is an additive correction fluid comprising:

(a) a film forming aliphatic and/or aromatic ester of phosphoric acid; and (b) an organic solvent or solvent mixture that does not dissolve the image areas of a plate to be corrected.

In another embodiment, the invention is a method for adding image areas to a printing plate. In still another embodiment, the invention is a kit comprising the additive correction fluid.

DETAILED DESCRIPTION OF THE INVENTION

The first essential component of the additive correction fluid is a film forming aliphatic and/or aromatic ester of phosphoric acid (hereafter also referred to as the "film forming phosphate" or simply "phosphate").

The phosphate may have further functional groups selected from the group consisting of epoxy groups, hydroxy groups, $C_1$–$C_{10}$ alkoxy groups (in which the alkyl moiety may be substituted by a $C_6$–$C_{20}$ aryl group), aryloxy groups (in which the aryl moiety comprises 6–20 carbon atoms), —$SO_3R$ (in which R is selected from the group consisting of hydrogen, $C_1$–$C_{10}$ alkyl and $C_6$–$C_{20}$ aryl), —O—$SO_3R$ (in which R is as defined above), halogen, —$NO_2$, —O—PO$(OR)_2$ (in which each R independently is as defined above), —COOR and —$CONR_2$ (in which each R independently is as defined above), carbonyl groups and mixtures thereof.

Suitable phosphates are commercially available from Lubrizol Corporation, Wickliffe, Ohio, USA, and Lubrizol Coating Additives GmbH, Ritterhude, Germany, under the trade names LUBRIZOL® 2061 (a epoxy-functional phosphate), LUBRIZOL®2062 (an aliphatic/aromatic phosphate) and LUBRIZOL® 2063 (a hydroxy/carboxy functional phosphate). These phosphates are available in the form of highly viscous fluids comprising ethyleneglycol monobutyl ether.

The second essential component is an organic solvent, which does not dissolve the image areas of the plate to be corrected. Organic solvent also refers to solvent mixtures, i.e. mixtures of various organic solvents.

In principle, any organic solvent or solvent mixture conventionally used in lithographic printing inks as well as any organic solvent commonly used for cleaning printing plates may be used. Preferably, the solvent is selected from aliphatic and aromatic hydrocarbons, including terpenes and mixtures thereof. In connection with the drying properties of the correction fluid, it is preferred that the organic solvent or solvent mixture has an evaporation number measured according to DIN 53170 of about 1 to about 200, preferably about 1 to about 160, more preferably about 1 to about 50.

Especially preferred solvents are o-, m- or p-xylene and mixtures thereof, white spirit, toluene, and benzene. White spirit, or solvent naphtha, is a petroleum fraction comprising mainly hydrocarbons that boil in the range of about 135 to about 210° C. White spirit is available in various boiling ranges, for example about 145 to about 160° C., about 150 to about 195° C., about 140 to about 170° C., about 135 to about 180° C., about 180 to about 210° C., etc. It is preferred that aromatic hydrocarbons, especially benzene, be removed from the white spirit.

The correction fluid may further contain a dye or pigment for indicating the correction. Any dye or pigment usually used for increasing the image contrast in the radiation sensitive coating for a printing plate can be used provided it is soluble in the solvent of the correction fluid or easily introduced as a pigment in the disperse form. Suitable dyes and/or pigments include, for example, rhodamine dyes, methyl violet, anthraquinone pigments, and phthalocyanine dyes and/or pigments. Especially preferred are Sudan Red (C.I. 26110; 2,3-dimethyl-4-(2-hydroxy-1-naphthylazo) azobenzene), Sudan Blue II (C.l. 61554; 1,4-bis-(butylamino)anthraquinone), Sudan Black (C.I. 26150; [4-(benzene(azo)-naphthyl-1-azo]-2,2-dimethyl-2,3-dihydroperimidine and Solvent Green 3 (C.I. 61565; anthraquinone).

The correction fluid may contain one or more further conventional additives selected from those well known to those skilled in the art, such as, antioxidants, dispersion agents, wetting agents, and antifloating and antiflooding agents.

The amount of the film forming phosphate is preferably about 10 to about 50% by weight based on the total correction fluid. If the correction fluid is intended to be applied with a pen, the amount of the phosphate is preferably about 10 to about 40% by weight based on the total correction fluid, more preferably about 15 to about 30% by weight. If the application is done by a brush (i.e. in the case that a relatively large image area has to be added), the amount of the phosphate is preferably about 30% to about 50% by weight based on the total correction fluid, more preferably about 35 to about 45% by weight.

The amount of the organic solvent or solvent mixture is preferably about 50 to about 90% by weight based on the total correction fluid. For application by pen, the amount is preferably about 60 to about 90% by weight, more preferably about 60 to about 70% by weight. For application by brush, the amount is preferably about 50 to about 70% by weight, more preferably about 50 to about 60% by weight.

The dye and/or pigment is present in an amount of about 0 to about 2% by weight based on the total correction fluid, preferably about 0.05 to about 0.8% by weight, more preferably about 0.1 to about 0.5% by weight.

For brush application it is preferred to add about 2 to 10% by weight of a thickener soluble in the solvent or solvent mixture to increase the viscosity.

Preferred thickeners are AEROSIL® 380 finely divided silica and AEROSIL® 200 finely divided silica, which are pyrogenic silica acids available from Degussa, Germany.

For application by a pen, the viscosity of the correction fluid is preferably from about 1.5 to about 5.5 mPa●s (measured with ball viscometer and ball No. 2), more preferably from about 2.5 to about 5.3 mPa●s. For brush application it is preferably about 5 to about 12 mPa●s, more preferably from about 5.3 to 11.4 mPa●s.

The correction fluid can be used for correction of conventional positive working and negative working plates imaged by the use of a mask, plates that are directly imageable by a laser, i.e. without using a mask, organic photoconductive plates, etc. Preferably, the plates have a metal substrate, such as an aluminum substrate, or a polymer substrate, such as polyethylene terephthalate, coated with metal.

The correction fluids show good adhesion on all types of interlayers. They can be applied to printing plates having a polyvinyl phosphonic acid interlayer (PVPA), a phosphate/fluoride interlayer, a PVPA-copolymer interlayer, a silicate interlayer, or an interlayer of a copolymer of vinylphosphonic acid and maleic acid anhydride. Plates having been pretreated with HCl or $HNO_3$ together with phosphate fluoride and plates having a LOMAR® condensed naphthalene sulfonic acid (Henkel, Düisseldorf, Germany) substrate can also be corrected. Furthermore, they have a high print run stability and can be baked at usual temperatures. In addition, the correction fluids do not dissolve the coating of the image areas and dry quickly.

Complete drying of the plate to be corrected is not necessary before the correction fluid is applied. Some residual moisture is not detrimental as to conventional correction fluids. Thus, another advantage of these correction fluids is that they can be applied to a plate already mounted on a press and wetted with fountain solution without the necessity of complete drying of the plate.

Depending on the size of the image area to be added, the correction fluids of the invention are applicable by pen and by brush. The suitable viscosity for each application is obtainable by the selection of the amount of solvent and phosphate and the optional use of a thickener for application by brush where necessary.

The invention also relates to a method for adding image areas to a printing plate. The method comprises applying a correction fluid according to the invention to a printing plate being in need of correction and drying the added image areas.

It is preferred that the corrected plate is subjected to a preheat or a baking step at a temperature in the range of about 50 to about 300° C. In a further preferred embodiment, the correction fluid is applied to the plate while the plate is mounted on a press.

The invention also provides a kit comprising a) a first container, the first container containing a correction fluid, the correction fluid comprising:

30 to 50% by weight of a material selected from the group consisting of film forming aliphatic esters of phosphoric acid, film forming aromatic esters of phosphoric acid, film forming aromatic and aliphatic esters of phosphoric acid, and mixtures thereof; and 50 to 70% by weight of an organic solvent that does not dissolve the image areas;

(b) a second container, the second container containing the same organic solvent as in the first container;

(c) a brush adapted to apply the correction fluid to the plate: and (d) a refillable pen.

A user of such a kit may apply the correction fluid directly with the brush. A further possibility is that the user may fill the refillable correction pen with the correction fluid. If the viscosity of the correction fluid is too high for application with the pen (i.e. more than about 5 mPa●s measured with a Höppler ball viscometer using ball No. 2), the user can further dilute the correction fluid with organic solvent from the second container and fill the pen with the diluted fluid.

The refillable pen can be any pen known in the art for applying correction fluids, for instance pens having a tank like pens having a valve or pens having a tampon inside. Valve markers comprise a container that is closed with a valve. Upon slight pressure on the correction tip, the valve opens and releases correction fluid, which is then transferred to the plate via the fiber rod (tip). Correction fluid is absorbed by a felt tampon and transferred to the plate via a fiber rod tip (capillary effect). Suitable pens are for instance commercially available from Ratioplast GmbH, Schwabach, Germany.

Suitable application systems with a brush are for instance commercially available from Geka-brush GmbH, Bechhofen-Waizendorf, Germany, and Löffler Kunststoffwerk GmbH, Freyung-Linden, Germany. Any conventionally used application system can be used as far as its components are resistant to the solvent of the correction fluid. For refillable pens, an aluminum case is preferred.

Industrial Applicability

The correction fluid can be used to correct all types of lithographic printing plates, independent of the type of interlayer present. It has good adhesion to a variety of interlayers, can be baked, and produces image areas having a high print run stability. Furthermore, the correction fluid dries quickly, has no dissolving effect on the image areas of the plate, and is applicable by pen and brush.

The advantageous properties of the invention may be observed by reference to the following examples, which illustrate, but do not limit the invention.

EXAMPLES

Examples 1 to 13 (correction fluids)

For pen application correction fluids have been prepared by mixing a phosphate, a solvent or solvent mixture and a dye as shown in Table 1 below; the amounts are given in % by weight (based on the total composition) in Table 1.

TABLE 1

| Example | Phosphate (% by weight) | Solvent (% by weight) | dye (% by weight) |
|---|---|---|---|
| 1 | LUBRIZOL 2062[a] (39.5) | Xylene (30.0) White Spirit 135/180[d] (30.0) | Sudan Red[f] (0.5) |
| 2 | LUBRIZOL 2062 (39.5) | White Spirit 135/180 (60.0) | Sudan Red (0.5) |
| 3 | LUBRIZOL 2062 (29.9) | Xylene (70.0) | Sudan Red (0.1) |
| 4 | LUBRIZOL 2062 (29.9) | Xylene (35.0) White Spirit 135/180 (35.0) | Sudan Red (0.1) |
| 5 | LUBRIZOL 2062 (29.9) | Xylene (50.0) White Spirit 180/210[e] (20.0) | Sudan Red (0.1) |
| 6 | LUBRIZOL 2061[b] (29.9) | Xylene (70.0) | Sudan Red (0.1) |
| 7 | LUBRIZOL 2063[c] (39.5) | White Spirit 135/180 (60.0) | Sudan Red (0.5) |
| 8 | LUBRIZOL 2062 (30.0) | Xylene (70.0) | — |
| 9 | LUBRIZOL 2062 (29.9) | Xylene (35.0) White Spirit 180/210 (35.0) | Sudan Red (0.1) |
| 10 | LUBRIZOL 2063 (39.5) | Xylene (60.0) | Sudan Red (0.5) |
| 11 | LUBRIZOL 2062 (30.0) | Xylene (70.0) | Solvent Green 3 |
| 12 | LUBRIZOL 2062 (30.0) | Xylene (70.0) | Sudan Blue II |
| 13 | LUBRIZOL 2062 (30.0) | Xylene (70.0) | Sudan Black B |

[a] Aliphatic/aromatic ester of phosphoric acid, available from Lubrizol Coating Additives GmbH, Ritterhude, Germany, 60% solution in iso-butyl alcohol.
[b] Ester of phosphoric acid with epoxy groups, available from Lubrizol Coating Additives GmbH, Ritterhude, Germany, 66% solution in ethylene glycol monobutyl ether
[c] Ester of phosphoric acid with hydroxy/carboxy groups, available from Lubrizol Coating Additives GmbH, DE, 60% solution in ethylene glycol monobutyl ether.
[d] White Spirit with a boiling range of 135 to 180° C.
[e] White Spirit with a boiling range of 180 to 210° C.

Examples 14–20 (Printing tests)

The correction fluids were applied to a printing plate by a correction pen, dried with a hair dryer for about 2 minutes and then used for printing without any baking step. A WINNERS®T-76 printing plate (Kodak Polychrome Graphics, Osterode, Germany) (a negative working printing plate), a VITESSE® printing plate (Kodak Polychrome Graphics, Osterode, Germany) (a negative working plate), and a Virage Plate (Kodak Polychrome Graphics, Osterode, Germany) (a positive working plate) were used. The plates were imagewise exposed and developed by usual means. Table 2 below shows the press life obtained for each plate.

TABLE 2

| Example | Correction Fluid | Press Life |
|---|---|---|
| 14 | Example 1 | >50,000 for each tested plate |
| 15 | Example 2 | >50,000 for each tested plate |
| 16 | Example 3 | >50,000 for each tested plate |
| 17 | Example 4 | >50,000 for each tested plate |
| 18 | Example 5 | about 50,000 for each tested plate |
| 19 | Example 8 | >50,000 for each tested plate |
| 20 | Example 9 | >50,000 for each tested plate |

Example 21

The correction fluids of Examples 11–13 were applied to a printing plate. When comparing the three corrections visually, it was found that all three dyes are suitable for indicating the added image area. Solvent Green 3, however, results in a color where the correction can be controlled more easily compared to the Sudan dyes.

Having described the invention, we now claim the following and their equivalents.

What is claimed is:

1. A correction fluid for the correction of printing plates comprising image areas and non-image areas, the fluid comprising:

(a) a material selected from the group consisting of film forming aliphatic esters of phosphoric acid, film forming aromatic esters of phosphoric acid, film forming aromatic and aliphatic esters of phosphoric acid, and mixtures thereof and (b) an organic solvent that does not dissolve the image areas; in which the ester additionally comprises one or more functional groups selected from the group consisting of: epoxy groups; —OH; unsubstituted $C_1$–$C_{10}$ alkoxy groups; $C_1$–$C_{10}$ alkoxy groups in which the alkyl moiety is substituted by a $C_6$–$C_{20}$ aryl group; aryloxy groups in which the aryl moiety comprises 6–20 carbon atoms; —$SO_3R$; —O—$SO_3R$; halogens; —$NO_2$; —O—$PO(OR)_2$ in which the R groups can be the same or different; —COOR; —$CONR_2$ in which the R groups can be the same or different; and carbonyl groups;

in which R is selected from the group consisting of hydrogen, $C_1$–$C_{10}$ alkyl and $C_6$–$C_2$ aryl.

2. A correction fluid for the correction printing plates comprising image areas and non-image areas, the fluid compromising:

(a) a material selected from the group consisting of film forming aliphatic esters of phosphoric acid, film forming aromatic esters of phosphoric acid, film forming aromatic and aliphatic esters of phosphoric acid, and mixtures thereof; and (b) an organic solvent that does not dissolve the image areas, in which:

the ester comprises about 10% to about 50% by weight of the, correction fluid;

the organic solvent comprises about 50% to about 90% by weight of the correction fluid; and the ester is selected from the group consisting of epoxy-functional phosphates, aliphatic/aromatic phosphates, and hydroxy/carboxy-functional phosphates.

3. The correction fluid of claim 1 in which the organic solvent is selected from the group consisting of aromatic and aliphatc hydrocarbons and mixtures thereof.

4. The correction fluid of claim 1 further comprising a dye soluble in the solvent or a pigment easily introducable in the disperse form.

5. The correction fluid of claim 1 in which the ester comprises about 10% to about 50% by weight of the correction fluid.

6. A correction fluid for the correction of printing plates comprising image areas and non-image areas, the fluid comprising:

(a) a material selected from the group consisting of film forming aliphatic esters of phosphoric acid, film forming aromatic esters of phosphoric acid, film forming aromatic and aliphatic esters of phosphoric acid, and mixtures thereof; and (b) an organic solvent that does not dissolve the image areas;

in which the ester comprises about 10% to about 40% by weight of the correction fluid.

7. A correction fluid for the correction of printing plates comprising image areas and non-image areas, the fluid comprising:

(a) a material selected from the group consisting of film forming aliphatic esters of phosphoric acid, film forming aromatic esters of phosphoric acid, film forming aromatic and aliphatic esters of phosphoric acid, and mixtures thereof; and (b) an organic solvent that does not dissolve the image areas; in which the ester comprises about 30% to about 50% by weight of the correction fluid.

8. A correction fluid for the correction of printing plates comprising image areas and non-image areas, the fluid comprising:

(a) a material selected from the group consisting of film forming aliphatic esters of phosphoric acid, film forming aromatic esters of phosphoric acid, film forming aromatic and aliphatic esters of phosphoric acid, and mixtures thereof; and (b) an organic solvent that does not dissolve the image area; in which the organic solvent comprises about 50% to about 90% by weight of the correction fluid.

9. The correction fluid of claim 1 further comprising a thickener.

10. A method for adding image areas to a printing plate, the method comprising:

applying a correction fluid to the printing plate and forming a corrected printing plate; and drying the corrected printing plate;

in which the fluid comprises:

(a) a material selected from the group consisting of film forming aliphatic esters of phosphoric acid, film forming aromatic esters of phosphoric acid, film forming aromatic and aliphatic esters of phosphoric acid, and mixtures thereof; and (b) an organic solvent that does not dissolve the image areas.

11. The method of claim 10 in which the ester is selected from the group consisting of epoxy-functional phosphates, aliphatic/aromatic phosphates, and hydroxy/carboxy-functional phosphates.

12. The method of claim 10 in which the correction fluid is applied by a brush.

13. The method of claim 12 in which the correction fluid comprises from about 30% to about 50% by weight of the ester.

14. The method of claim 10 in which the correction fluid is applied by a pen.

15. The method of claim 14 in which the correction fluid comprises from about 10% to about 40% by weight of the ester.

16. The method of claim 10 further comprising heating of the corrected plate at a temperature in the range of about 50° to about 300° C.

17. The method of claim 10 in which the plate is mounted on a press.

18. A kit for correcting a lithographic printing plate having a metal substrate, the kit comprising:

(a) a first container, the first container containing a correction fluid, the correction fluid comprising:

30 to 50% by weight of a material selected from the group consisting of film forming aliphatic esters of phosphoric acid, film forming aromatic esters of phosphoric acid, film forming aromatic and aliphatic esters of phosphoric acid, and mixtures thereof; and 50 to 70% by weight of an organic solvent that does not dissolve the image areas;

(b) a second container, the second container containing the organic solvent;

(c) a brush adapted to apply the correction fluid to the plate: and (d) a refillable pen.

19. The kit of claim 18 in which:

the ester comprises about 10% to about 50% by weight of the correction fluid;

the organic solvent comprises about 50% to about 90% by weight of the correction fluid; and the phosphate ester is selected from the group consisting of epoxy-functional phosphates, aliphatic/aromatic phosphates, and hydroxy/carboxy-functional phosphates.

20. The correction fluid of claim 1 in which:

the ester comprises about 10% to about 50% by weight of the correction fluid;

the organic solvent comprises about 50% to about 90% by weight of the correction fluid; and the ester is selected from the group consisting of epoxy-functional phosphates, aliphatic/aromatic phosphates, and hydroxy/carboxy-functional phosphates.

21. The correction fluid of claim 20 in which the solvent has an evaporation number of about 1 to about 50.

22. The correction fluid of claim 21 in which the correction fluid additionally comprises a thickener and either a dye soluble in the solvent or a pigment easily introducable in the disperse form.

23. The method of claim 11 in which the ester comprises about 10% to about 50% by weight of the correction fluid;

the organic solvent comprises about 50% to about 90% by weight of the correction fluid; and the ester is selected from the group consisting of epoxy-functional phosphates, aliphatic/aromatic phosphates, and hydroxy/carboxy-functional phosphates.

24. The method of claim 23 in which the solvent has an evaporation number of about 1 to about 50.

25. The method of claim 24 in which the correction fluid additionally comprises a thickener and either a dye soluble in the solvent or a pigment easily introducable in the disperse form.

26. The method of claim 25 in which applying the correction fluid produces a correction and the dye or pigment indicates the correction.

27. The method of claim 10 in which the ester additionally comprises one or more functional groups selected from the group consisting of epoxy groups; —OH; unsubstituted $C_1$–$C_{10}$ alkoxy groups; $C_1$–$C_{10}$ alkoxy groups in which the alkyl moiety is substituted by a $C_6$–$C_{20}$ aryl group; aryloxy groups in which the aryl moiety comprises 6–20carbon atoms ; —$SO_3R$; —O—$SO_3R$; halogens; —$NO_2$; —O—PO$(OR)_2$ in which the R groups can be the same or different; —COOR; —$CONR_2$ in which the R groups can be the same or different; and carbonyl groups;

in which R is selected from the group consisting of hydrogen, $C_1$–$C_{10}$ alkyl, and $C_6$–$C_{20}$ aryl.

28. The method of claim 27 in which the ester comprises about 10% to about 50% by weight of the correction fluid;

the organic solvent comprises about 50% to about 90% of the correction fluid; and the ester is selected from the group consisting epoxy-functional phosphates, aliphatic/aromatic phosphates, and hydroxy/carboxy-functional phosphates.

29. The method of claim 28 in which the correction fluid additionally comprises a thickener and either a dye soluble in the solvent or a pigment easily introducable in the disperse form, applying the correction fluid produces a correction, and the dye or pigment indicates the correction.

* * * * *

UNITED STATES PATENT AND TRADEMARK OFFICE

CERTIFICATE OF CORRECTION

PATENT NO. : 6,517,622 B1 
DATED : February 11, 2003
INVENTOR(S) : Ulrich Fiebag and Uwe Tondock It is certified that error appears in the above-identified patent and that said Letters Patent is hereby corrected as shown below:

Column 7,
Line 25, delete "$C_6$-$C_2$" and insert -- $C_6$-$C_{20}$ --
Line 25, between "correction" and "printing" insert -- of --
Line 36, delete "the," and insert -- the --

Column 10,
Line 15, delete "6-20carbon" and insert -- 6-20 carbon --

Signed and Sealed this

Fifteenth Day of July, 2003

JAMES E. ROGAN
*Director of the United States Patent and Trademark Office*